United States Patent
Kfir et al.

(10) Patent No.: US 12,107,943 B2
(45) Date of Patent: Oct. 1, 2024

(54) PARSING USING NULL HEADER NODE

(71) Applicant: MELLANOX TECHNOLOGIES, LTD., Yokneam (IL)

(72) Inventors: Aviv Kfir, Nili (IL); Ortal Ben Moshe, Ein HaEmek (IL); Barak Gafni, Sunnyvale, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 343 days.

(21) Appl. No.: 17/855,362

(22) Filed: Jun. 30, 2022

(65) Prior Publication Data
US 2024/0007548 A1  Jan. 4, 2024

(51) Int. Cl.
H04L 69/22 (2022.01)
H04L 12/46 (2006.01)
H04L 45/50 (2022.01)

(52) U.S. Cl.
CPC .......... H04L 69/22 (2013.01); H04L 12/4633 (2013.01); H04L 45/50 (2013.01)

(58) Field of Classification Search
None
See application file for complete search history.

(56) References Cited

U.S. PATENT DOCUMENTS

| | | | | |
|---|---|---|---|---|
| 6,356,951 B1 * | 3/2002 | Gentry, Jr. | ............ | H04L 69/161 709/217 |
| 6,483,804 B1 * | 11/2002 | Muller | .................. | H04L 49/602 709/228 |
| 6,665,725 B1 * | 12/2003 | Dietz | .................... | H04L 49/205 709/228 |
| 7,366,961 B1 * | 4/2008 | Kovacevic | ........... | H04N 21/434 714/701 |
| 7,558,240 B2 * | 7/2009 | Chen | ..................... | H04W 76/12 370/338 |
| 7,688,859 B2 * | 3/2010 | Chen | ........................ | H04L 47/10 370/473 |
| 11,234,163 B1 * | 1/2022 | Ho | ......................... | H04W 28/06 |
| 2010/0265948 A1 * | 10/2010 | Patel | ....................... | H04L 45/38 370/392 |
| 2014/0219277 A1 * | 8/2014 | Bosshart | ................. | H04L 45/20 370/392 |
| 2015/0081726 A1 * | 3/2015 | Izenberg | ................. | H04L 69/16 707/755 |
| 2015/0334033 A1 * | 11/2015 | Wang | ...................... | H04L 69/04 370/389 |
| 2018/0184136 A1 * | 6/2018 | Oh | ......................... | H04N 21/23 |
| 2021/0176345 A1 * | 6/2021 | Urman | .................... | H04L 69/22 |

* cited by examiner

*Primary Examiner* — Eunsook Choi
(74) *Attorney, Agent, or Firm* — Sheridan Ross P.C.

(57) ABSTRACT

A networking device and system are described, among other things. An illustrative system is disclosed to include a packet parser and a state machine that includes a NULL header state. The packet parser references the state machine to enter the NULL header state automatically in response to parsing a packet header of a predetermined type and then, while in the NULL header state, analyzes a subsequent set of bytes without advancing a parser pointer.

22 Claims, 8 Drawing Sheets

PARSING USING NULL HEADER NODE

FIELD OF THE DISCLOSURE

The present disclosure is generally directed to systems, methods, and devices for analyzing packets and, in particular, toward packet parsing in a communication network.

BACKGROUND

Networking devices such as routers, switches, Network Interface Controllers (NICs), etc. normally include a packet processing subsystem that manages the traversal of packets across a multi-layered network or protocol stack. For examples, the network devices may be used in networking systems, like datacenters, for routing data between endpoints. In some cases, as part of the packet processing and for routing the data, the network devices may use packet parsing as a method to find headers in packets and analyze fields inside the headers to determine how to route the packets within a communication network.

BRIEF SUMMARY

Embodiments of the present disclosure aim to improve packet parsing in a communication network. Some protocols included in a packet do not include a next-protocol field for supporting a state-machine to transition from a given header to a next header, and the parsing of a subsequent header after the header that does not include the next-protocol field may depend on a field in the next header itself. In some cases, the parsing of the subsequent header may involve "guessing" what the subsequent header is without knowing specifically the specific protocol corresponding to the subsequent header. As described herein, a 'null' header is provided to enable transitioning between the protocols that do not include a next-protocol field to the subsequent header or protocol. The 'null' header may comprise a header with a size of zero bytes that, when a parser transitions to the 'null' header, the parser inspects fields from the subsequent header while maintaining a parsing position to determine the protocol of the subsequent header for enabling transitioning from the 'null' header to the subsequent header.

Example aspects of the present disclosure include a networking device comprising: a parser that analyzes one or more packets by: parsing a header in the one or more packets; determining the header comprises a zero length; and analyzing, in response to determining that the header comprises a zero length, a field of a subsequent header in the one or more packets while maintaining a position of a parser pointer at the header.

In some embodiments, the header includes a NULL header.

In some embodiments, the subsequent header includes an Internet Protocol (IP) version header.

In some embodiments, the NULL header is positioned immediately following a Multiprotocol Label Switching (MPLS) header.

In some embodiments, the NULL header is positioned immediately following a General Packet Radio Service (GPRS) Tunneling Protocol (GTP) header.

In some embodiments, the one or more packets include an Internet Protocol (IP) packet.

In some embodiments, the header is positioned between a Media Access Control (MAC) header and an Internet Protocol (IP) version header.

In some embodiments, the field comprises a version field of the subsequent header and is treated as a Next Protocol (NP) field of the header.

In some embodiments, the parser further extracts data from an Internet Header Length (IHL) field of the subsequent header.

In some embodiments, the parser advances the parser pointer from the header based on the data extracted from the IHL field.

In some embodiments, the position of the parser pointer at the header coincides with a beginning position of the subsequent header.

In some embodiments, the networking device further includes an interface that receives the one or more packets.

In some embodiments, a system is provided that includes: a packet parser; and a state machine that includes a NULL header state, where the packet parser references the state machine to enter the NULL header state automatically in response to parsing a packet header of a predetermined type and then, while in the NULL header state, analyzes a subsequent set of bytes without advancing a parser pointer.

In some embodiments, the state machine comprises a first Internet Protocol (IP) version state and a second IP version state and wherein the packet parser transitions from the NULL header state to either one of the first IP version state and second IP version state based on the analysis of the subsequent set of bytes.

In some embodiments, the packet parser analyzes an Internet Header Length (IHL) field of the subsequent set of bytes and advances the parser pointer by a number of bytes defined in the IHL field.

In some embodiments, the predetermined type comprises a NULL type and the header includes a length of zero bytes.

In some embodiments, the packet includes an Internet Protocol (IP) packet, where the subsequent set of bytes comprises an IP version header, and where a beginning of the header is positioned coincident with a beginning of the IP version header.

In some embodiments, the header is positioned between the IP version header and a Media Access Control (MAC) header.

In some embodiments, a networking device is provided that includes: a processor; and memory coupled to the processor, where the memory includes data that, when executed by the processor, enables the processor to: analyze a header in a packet; determine the header corresponds to a NULL header; and analyze, in response to determining that the header corresponds to a NULL header, a field of a subsequent header in the packet while holding a parser pointer at the NULL header.

In some embodiments, the processor further routes the packet within a communication network based, at least in part, on the analysis of the field of the subsequent header.

In some embodiments, the subsequent header includes an Internet Protocol (IP) version header and the field of the IP version header includes at least one of a version field, an (IHL) field, and a Next Protocol (NP) field.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
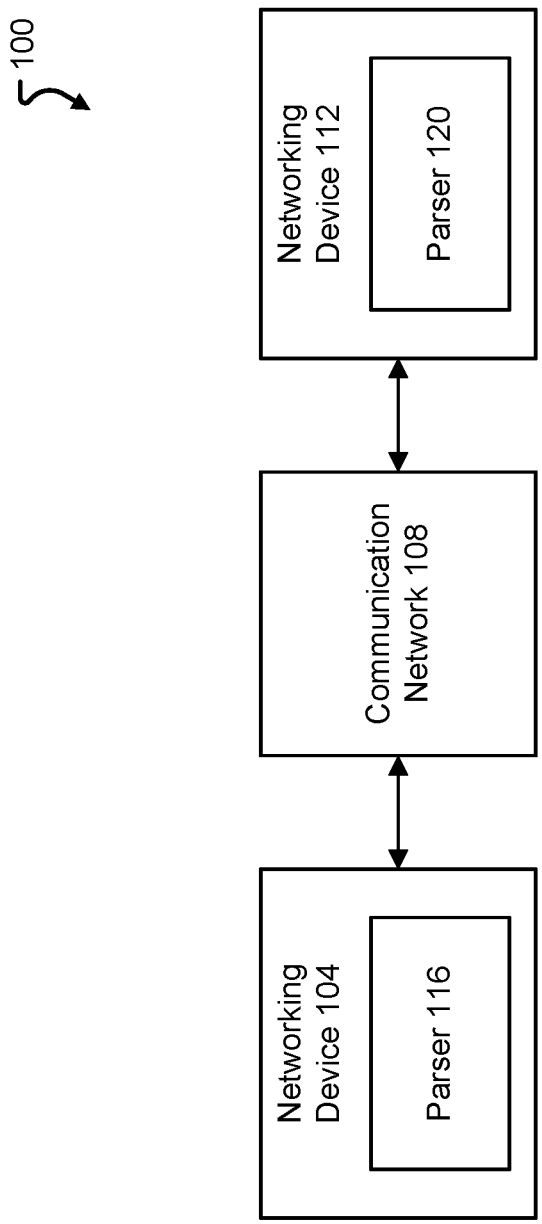
FIG. 1 illustrates a block diagram of a networking system according to at least one example embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Packet parsing is a method of finding headers and fields inside the headers in a given stream of bytes (e.g., a packet). Parsing is usually done by a state-machine that transitions from a first header to a next header based on a next-protocol field that resides in the first header. That is, traditional header parsing is performed by looking at a current header next-protocol field and deciding what should be the next header based on the next-protocol field. For example, the state-machine parser is moving from one header to the next header, and the next header depends on the parsing of the previous header.

However, some unique protocols (e.g., such as a multi-protocol label switching (MPLS), a general packet radio service (GPRS) tunneling protocol (GTP), etc.) may not include a next-protocol field, such that the parsing of a next header after such unique protocols depends on a field in the next header itself. Transitioning between the unique protocols and subsequent headers may include the parser state-machine 'guessing' because the parser state-machine may guess the next-header without knowing the next header up front.

To enable more efficient transitioning between protocols/headers that do not include next-protocol fields and a subsequent header in a packet (e.g., for parsing the protocols/headers that do not include next-protocol fields), a 'null header' or "NULL header" is described and provided herein that comprises a header with size of zero bytes. When a parser state-machine transitions to a 'null header,' the parser state-machine may inspect fields from a next header to determine which protocol is comprised in the next header without advancing a position of the parser state-machine (e.g., parser pointer). A next-protocol field may then make the transition from this 'null header' to the real next-header.

As an example, the parser state-machine may transition from a first header that does not include a next-protocol field to the 'null header' (e.g., in an always manner). Subsequently, the parser state-machine may not advance a parser pointer based on the 'null header' being defined as having zero length, and the parser state-machine may analyze one or more fields in a subsequent header after the 'null header' while maintaining a position of the parser pointer to determine a corresponding protocol for the subsequent header (e.g., 'ver' field or another field in the subsequent header). The parser state-machine may then transition to the subsequent header based on determining the corresponding protocol (e.g., without "guessing"). In some examples, the 'null header' may reduce the number of transitions for headers that have all-to-all connectivity by first transitioning from all headers to the 'null header' and then transitioning from the 'null header' to all the other headers, which reduces the scale of a transition table from $O(N^2)$ to $O(N)$. Reducing the number of transitions may reduce a number of different transitions needed to be stored in a transition memory of a network device storing and/or using the parser state-machine.

Embodiments of the present disclosure provide technical solutions to one or more of the above-described problems of (1) a parser state-machine "guessing" protocols for moving from one header to a next header when performing a parsing operation and (2) burdening a memory of a network device storing different transitions in a transition memory for performing a parsing operation. For example, embodiments of the present disclosure may enable a parser state-machine to efficiently parse "guessing"-based protocols (e.g., such as MPLS, GTP, etc.), where information for a next protocol resides in the corresponding next header and not in a current header. Additionally, embodiments of the present disclosure may reduce a number of supported transitions that are stored in a memory of a network device based on supporting transitions from all headers to a "flex" node (e.g., the 'null header') and from the "flex" node to all headers (e.g., thereby reducing a number of stored supported transitions from $N^2$ to $2*N$).

FIG. 1 illustrates a system 100 according to at least one example embodiment. The system 100 includes a networking device 104, a communication network 108, and a networking device 112. In at least one example embodiment, networking devices 104 and 112 may correspond a network switch (e.g., an Ethernet switch), a collection of network switches, a network interface controller (NIC), or any other suitable device used to control the flow of data between devices connected to communication network 108. Each networking device 104 and 112 may be connected to one or more of Personal Computer (PC), a laptop, a tablet, a smartphone, a server, a collection of servers, or the like. In one specific, but non-limiting example, each networking device 104 and 112 includes multiple network switches in a fixed configuration or in a modular configuration.

Examples of the communication network 108 that may be used to connect the networking devices 104 and 112 include an Internet Protocol (IP) network, an Ethernet network, an InfiniBand (IB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 is a network that enables communication between the networking devices 104 and 112 using Ethernet technology. In one specific, but non-limiting example, the networking devices 104 and 112 correspond to director switches that may have a modular configuration. As discussed in more detail below, a network switch (e.g., a director switch) according to inventive concepts may implement multiple layers of a network topology as field replaceable units (FRUs) or customer replaceable units (CRUs) within a single chassis.

Although not explicitly shown, the networking device 104 and/or the networking device 112 may include storage devices and/or processing circuitry for carrying out computing tasks, for example, tasks associated with controlling the flow of data within each networking device 104 and 112 and/or over the communication network 108. Such processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random-Access Memory (RAM), Read-Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an IC chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a PCB or collection of PCBs. It should be appreciated that any appropriate type of electrical component or collection of electrical components may be suitable for inclusion in the processing circuitry.

In addition, although not explicitly shown, it should be appreciated that the networking devices 104 and 112 include one or more communication interfaces for facilitating wired and/or wireless communication between one another and other unillustrated elements of the system 100.

In some embodiments, the networking devices 104 and 112 may include parsers 116 and 120, respectively. The parsers 116 and 120 may be used, in part, to process packets received from other networking devices, through the communication network 108, or a combination thereof, to determine how the packets are to be processed and/or how to route the packets within the communication network 108. In some examples, the parsers 116 and 120 may be a type of state machine (e.g., parser state-machine) that analyzes components or different portions of a packet (e.g., set of bytes) and the meaning of structured text and/or values included in the packet. For example, a state machine may be considered a directed graph comprised of a set of nodes and a set of transition functions for transitioning between each of the set of nodes. That is, the state machine may change from one state to another in response to one or more inputs, where the change from one state to another is called a transition.

The parsers 116 and 120 may be used to find headers and fields inside the headers in a given stream of bytes (e.g., a packet) based on parsing the stream of bytes by transitioning from a given first header to a next header based on fields (e.g., next-protocol field) that resides in the first header. For example, header parsing may be performed by looking at or parsing a current header of a packet (e.g., an initial portion or a given portion of the packet), identifying or determining a field in the current header that includes information corresponding to a next header in the packet occurring subsequent to the current header (e.g., a next-protocol field), and determining the next header and/or a protocol that corresponds to the next header based on the field in the current header. That is, the parsers 116 and 120 may move from one header to a next header when processing a packet, where the next header depends on parsing of the previous header. An example of a parser graph and corresponding parsing/processing operation are shown and described with reference to FIGS. 2 and 3A-3C.

However, in some examples, one or more headers in a packet may not include fields or information that corresponds to or indicates a header that occurs after such headers. For example, an MPLS header, a GTP header, or another header/protocol not explicitly listed herein may not include a next-protocol (NP) field that indicates which protocol and/or header occurs after subsequent to the given header. Accordingly, to transition from the header that does not include the NP field or a similar field to indicate a next occurring header, the parsers 116 and 120 may process or parse the next occurring header based on information or fields in the next header itself. In some examples, the parsers 116 and 120 may "guess" the protocol for the next header (e.g., not knowing the protocol or corresponding header up front) and may determine or verify the protocol or header according to a field in the next header itself to determine how to parse the current header. As such, it becomes difficult for the parsers 116 and 120 to know which protocol the next header corresponds to until the parsers 116 and 120 begin parsing the next header and analyzing bits in the next header to determine how to process the next header. The issues with parsing such headers that do not include the fields or information that corresponds to or indicates a next occurring header are shown and described in greater detail with reference to FIGS. 4A and 4B.

As described herein, a header construct is provided that enables transitioning from headers that do not include the fields or information that corresponds to or indicates a next occurring header to the next occurring header without the parsers 116 and 120 having to "guess" the next occurring header. For example, the header construct may be referred to as a 'null header,' where the 'null header' comprises a header with size of zero bytes. When the parsers 116 and 120 transition to the 'null header,' the parsers 116 and 120 may inspect fields from a next header to determine which protocol is comprised in the next header without advancing a position of the parsers 116 and 120 (e.g., parser pointer). The parsers 116 and 120 may then make the transition from this 'null header' to the real next header based on inspecting the fields from the next header (e.g., without "guessing" the next header and without advancing a position of the parsers 116 and 120). The 'null header' is described and shown in greater detail with reference to FIGS. 5 and 6A-6E.

Figure 2:
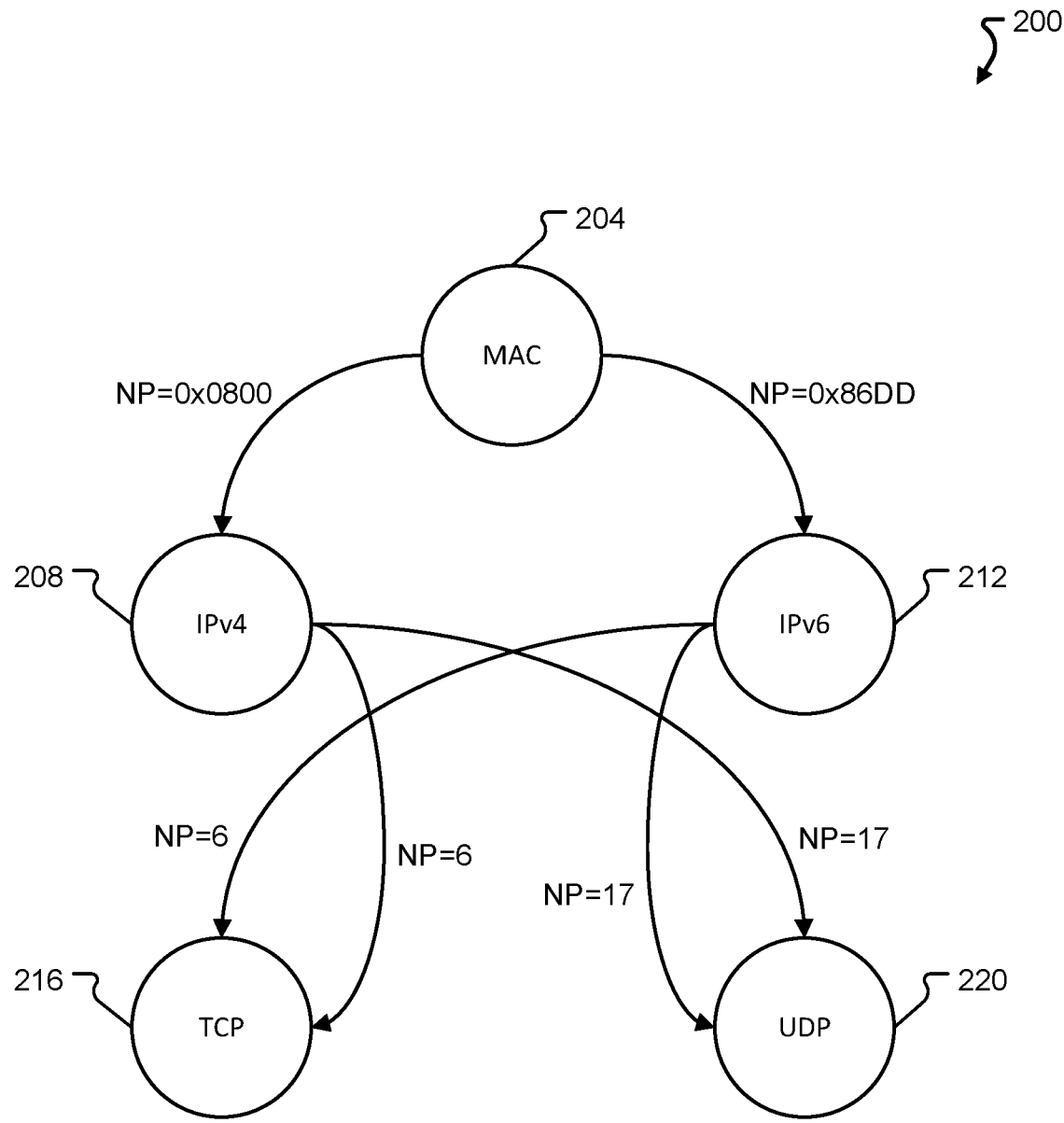
FIG. 2 illustrates an example of a parser graph according to at least one example embodiment of the present disclosure.

FIG. 2 illustrates an example of a parser graph 200 according to at least one example embodiment of the present disclosure. FIG. 2 and the parser graph 200 may implement aspects of or may be implemented by aspects of FIG. 1 as described herein. For example, the parser graph 200 may be used by a networking device and/or parser to perform a parsing operation when processing or parsing a packet, where the networking device and parser may be examples of corresponding devices as described with reference to FIG. 1 (e.g., the networking devices 104 and 112, the parsers 116 and 120, etc.).

As described previously, header parsing may be performed by the parser looking at a current header, identifying or determining an NP field in the current header, and deciding what should be the next header based on the NP field. For example, the parser may move from one header to the next header, and the next header depends on the parsing of the previous header.

In the example of FIG. 2, a starting state of the parser may be a first header 204 (e.g., a Media Access Control (MAC) header in the shown example). Subsequently, the parser may transition to a second header 208 (e.g., a first Internet Protocol (IP) version state, such as IPv4, in the shown example) or a third header 212 (e.g., a second IP version state, such as IPv6, in the shown example) based on an NP field (which may be referred to as Ethertype) value in the first header 204. For example, if the NP field value in the first header 204 is 0x0800, the parser may transition from the first header 204 to the second header 208. Additionally or alternatively, if the NP field value in the first header 204 is 0x86DD, the parser may transition from the first header 204 to the third header 212.

The parser may then transition from the second header 208 or third header 212 to a fourth header 216 (e.g., transmission control protocol (TCP) in the shown example)

or a fifth header 220 (e.g., user datagram protocol (UDP) in the shown example) based on an NP field in the corresponding second header 208 or third header 212. In some examples, the NP field may be referred to as a 'Protocol' field in IPv4 and as a 'Next Header' field in IPv6. If the corresponding NP field comprises a value of 6 in the second header 208 or the third header 212, the parser may transition from the second header 208 or third header 212 to the fourth header 216. Additionally or alternatively, if the corresponding NP field comprises a value of 17, the parser may transition from the second header 208 or third header 212 to the fifth header 220. Table 1 is provided below that lists supported transitions for the parser when performing a corresponding parsing operation as described in the example of FIG. 2. In some examples, the transition table corresponding to Table 1 may be stored in a memory of a networking device or a memory accessed by the networking device that implements, uses, and/or stores the parser described herein.

TABLE 1

Transition Table for Parsing an Example Packet

| Header | NP Field | Next Header |
|---|---|---|
| MAC | 0x0800 | IPv4 |
|  | 0x86DD | IPv6 |
| IPv4 | 6 | TCP |
|  | 17 | UDP |
| IPv6 | 6 | TCP |
|  | 17 | UDP |

In some examples, a method of operation for the parser may include advancing a parser pointer after finishing parsing a current header. Additionally, the parser may compute a current header length based on one or more additional fields that reside inside the header. The method of operation for the parser corresponding to the example of FIG. 2 and the parser graph 200 is described in greater detail with reference to FIGS. 3A-3C.

Figure 3A:
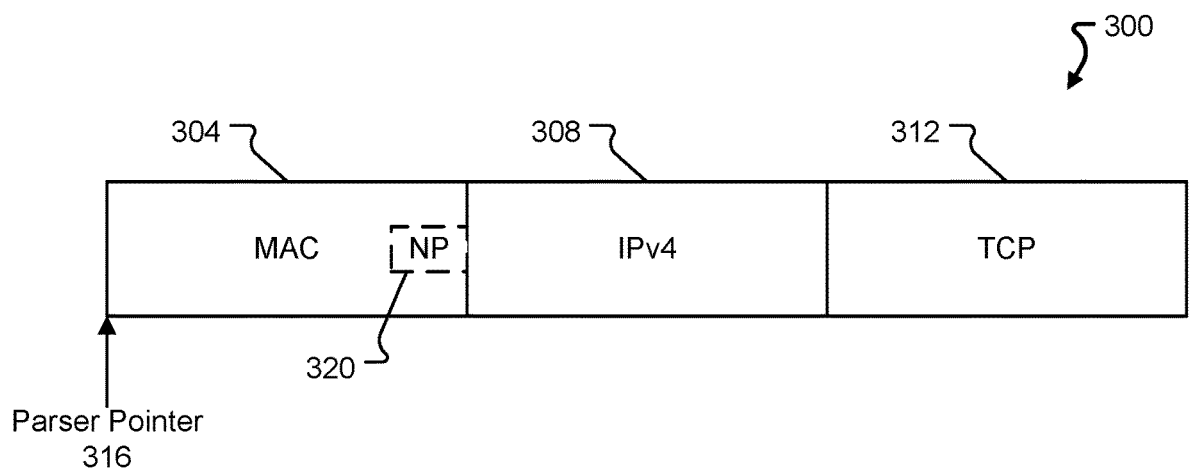
FIGS. 3A, 3B, and 3C illustrate an example of a parsing operation according to at least one example embodiment of the present disclosure.
Figure 3B:
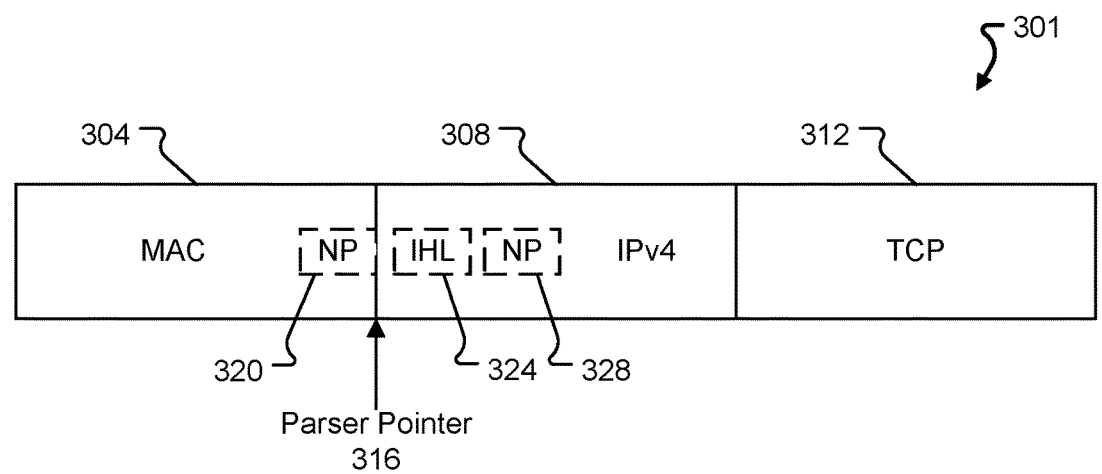
Figure 3C:
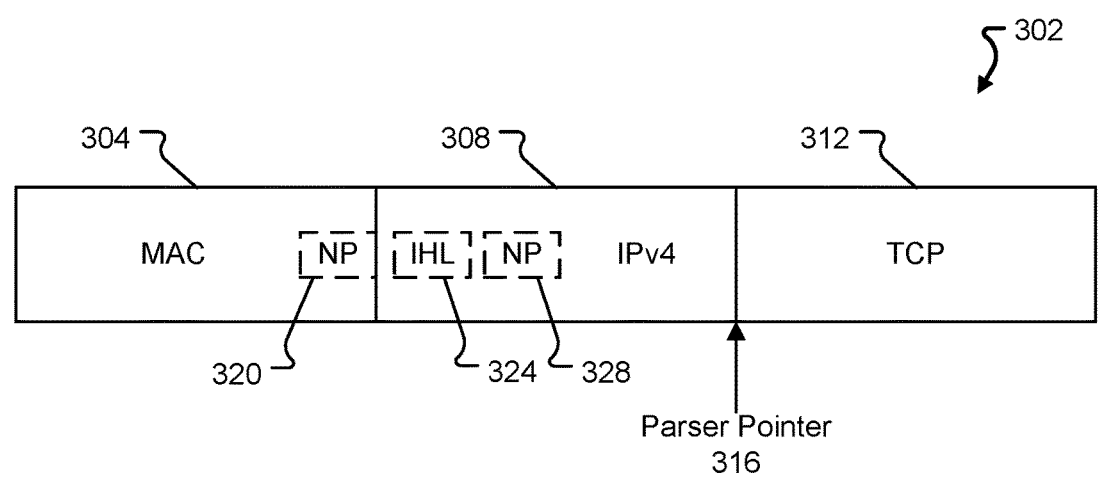

FIGS. 3A, 3B, and 3C illustrate an example of a parsing operation according to at least one example embodiment of the present disclosure. The parser operation may implement aspects of or may be implemented by aspects of FIGS. 1 and 2 described herein. For example, the parser operation may represent a method of operation for a parser corresponding to the parser graph 200 as described with reference to FIG. 2, and the parser may represent an example of the parser 116 and 120 as described with reference to FIGS. 1 and 2. The parser operation may include a first operation 300, a second operation 301, and a third operation 302. The different operations may represent an example of how the parser advances a parser pointer 316 when processing or parsing a packet. In some examples, the packet may at least include a first header 304 (e.g., MAC header in the shown example), a second header 308 (e.g., IPv4 header in the shown example), and a third header 312 (e.g., TCP header in the shown example).

At the first operation 300, the parser pointer 316 may point at a beginning of the first header 304. The parser may then extract a value of an NP field 320 from the first header 304 and look up the value in a corresponding transition table (e.g., Table 1 as provided previously) to determine which protocol the second header 308 corresponds to (e.g., a next occurring header in the packet after the first header 304). For example, in the example of FIG. 3, the lookup value for the NP field 320 may comprise 0x0800, such that the lookup result indicates that the parser is to transition to an IPv4 header for the second header 308. In some examples, a header length for the first header 304 may be constant (e.g., as specified by IEEE standards), such that the parser determines or knows to advance the parser pointer 316 by a given number of bytes (e.g., 14 bytes) to the beginning of the second header 308 (e.g., IPv4 header).

In the second operation 301, the parser pointer 316 may point to the beginning of the second header 308. The parser may then extract a value from an NP field 328 and a value from an Internet Header Length (IHL) field 324. The parser may determine the value of the NP field 328 is 6 and may look up the value of 6 in the transition table to determine the value corresponds to a transition to a TCP header for the third header 312. Additionally, the parser may compute a header length for the second header 308 based on the value for the IHL field 324. For example, the header length for the second header 308 may be four times the value for the IHL field 324 (e.g., 4xIHL), which in the example of FIG. 3 is equal to 20 bytes. Accordingly, the parser may determine to advance the parser pointer 316 by 20 bytes to the beginning of the third header 312 (e.g., TCP header). In the third operation 302, the parser pointer 316 may point to the beginning of the third header 312. In some examples, the third header 312 may be the last header that the parser parses in the example packet of FIG. 3. After parsing the third header 312, the networking device that is implementing the parser may determine how to route the corresponding packet in a communication network and/or may otherwise complete processing the packet for performing a corresponding action associated with the packet.

Figure 4A:
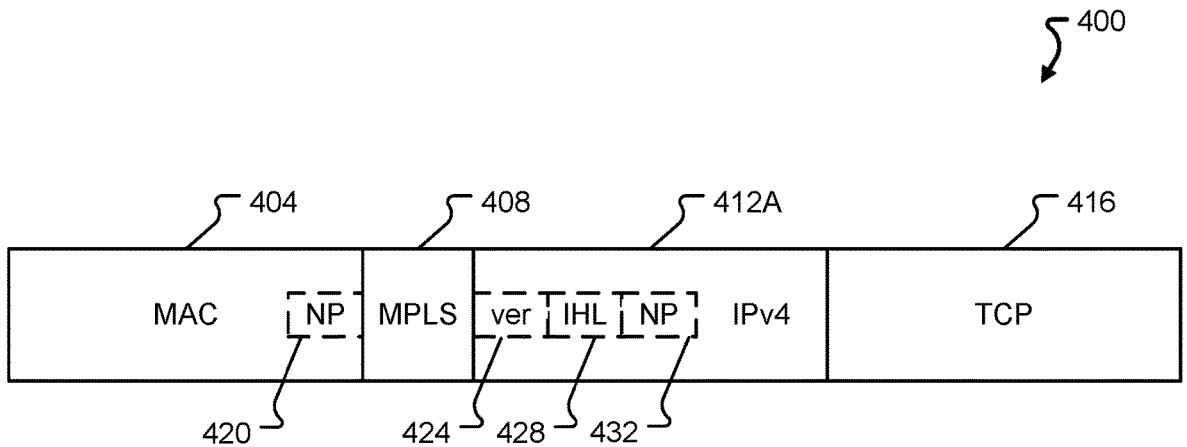
FIGS. 4A and 4B illustrate examples of packet configurations according to at least one example embodiment of the present disclosure.
Figure 4B:
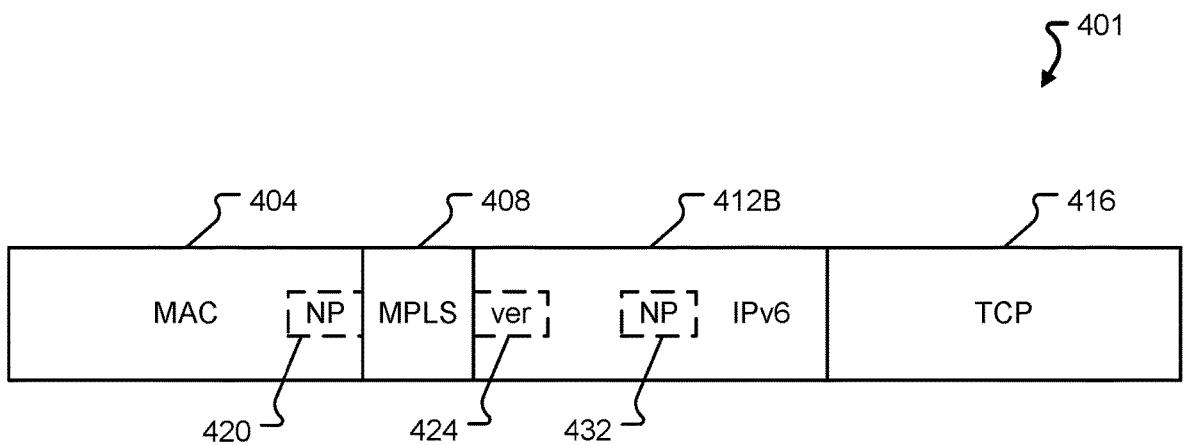

FIGS. 4A and 4B illustrate examples of packet configurations according to at least one example embodiment of the present disclosure. The packet configurations may implement aspects of or may be implemented by aspects of FIGS. 1-3C as described herein. For example, the packet configurations illustrated in FIGS. 4A and 4B may correspond to a packet received by a networking device, and the networking device may utilize a parser to process the packet, where the networking device and parser may represent examples of corresponding devices/components as described with reference to FIGS. 1-3C (e.g., the networking devices 104 and 112, the parsers 116 and 120, etc.). FIG. 4A may illustrate an example of a packet configuration 400, and FIG. 4B may illustrate an example of a packet configuration 401. The packet configurations 400 and 401 may comprise a first header 404 (e.g., MAC header in the shown example), a second header 408 (e.g., MPLS header in the shown example), a third header 412 (e.g., IPv4 header in the example of FIG. 4A and IPv6 in the example of FIG. 4B), and a fourth header 416 (e.g., TCP header).

In some examples, the second header 408 may not include an NP field, such that the parser may transition from the second header 408 to the third header 412 according to a field in the third header 412 itself. For example, in the examples of FIGS. 4A and 4B, the parser may transition from the first header 404 to the second header 408 based on a value determined from an NP field 420 in the first header 404 (e.g., the value for the NP field 420 is 0x8847, which corresponds to transitioning to an MPLS header for the second header 408 as configured in a corresponding transition table). Accordingly, the parser may advance a parser pointer to the beginning of the second header 408.

However, the second header 408 may not include an NP field definition, such that the parser does not know whether to transition to a first option 412A for the third header (e.g., IPv4 header as shown in the example of FIG. 4A) or to a second option 412B for the third header (e.g., IPv6 header as shown in the example of FIG. 4B). Subsequently, the parser may "guess" which option or which protocol the third header 412 is by moving the parser pointer to the beginning of the third header 412 and looking at bits and/or a field in the third header 412 to determine how to parse or analyze the third header 412. For example, the parser may transition to the third header 412 without knowing what protocol corresponds to the third header 412 and then look up information in a field 424 (e.g., 'Ver' or version field), which then tells the parser how to parse the current header (e.g., the third header 412). The parser may then determine values for an IHL field 428 and/or NP field 432 in the third header 412 to determine how to parse the fourth header 416.

Figure 5:
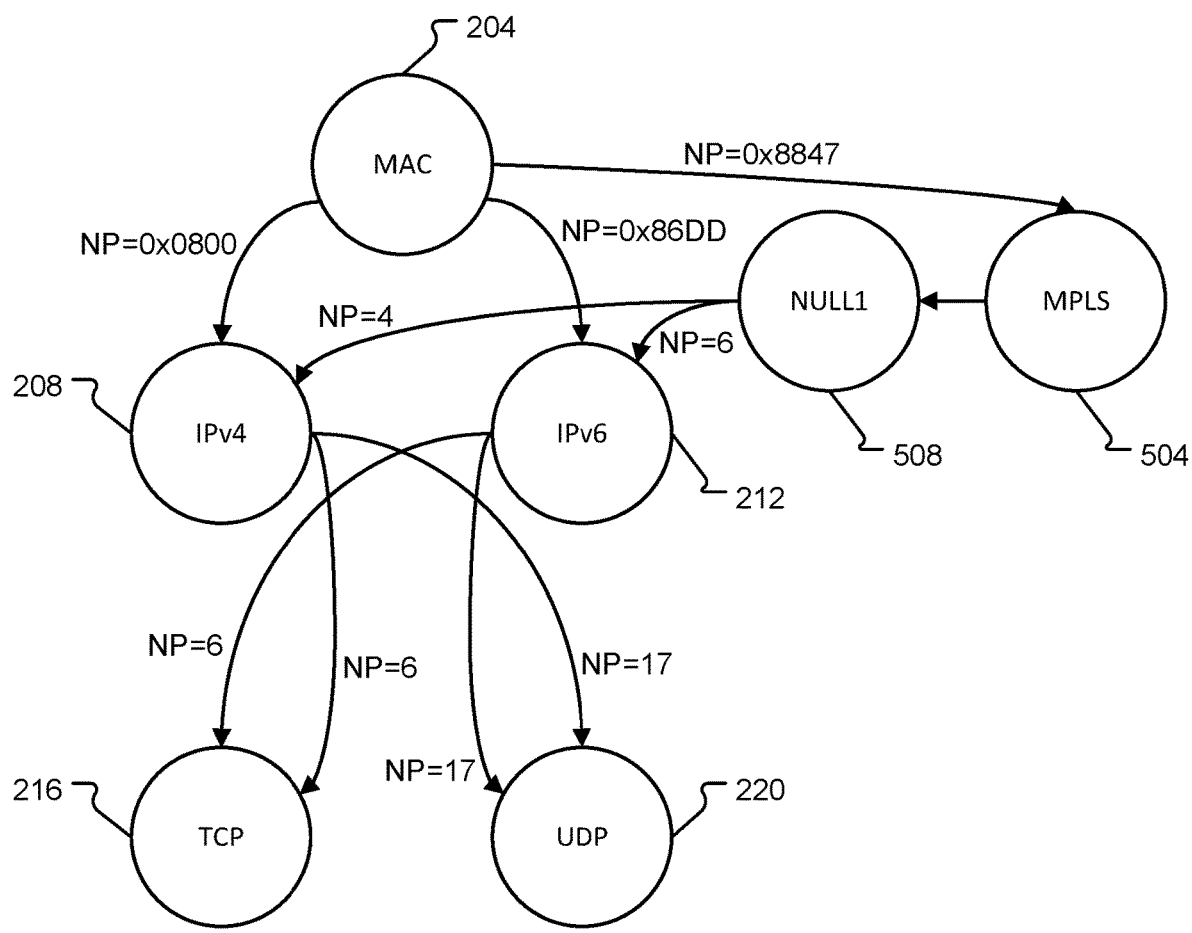
FIG. 5 illustrates an example of a parser graph according to at least one example embodiment of the present disclosure.

FIG. 5 illustrates an example of a parser graph 500 according to at least one example embodiment of the present disclosure. The parser graph 500 may implement aspects of or may be implemented by aspects of FIGS. 1-4B as described herein. For example, a networking device may use a parser to parse a packet based on the parser graph 500, where the networking device and the parser may represent examples of corresponding devices/components as described with reference to FIGS. 1-4B. Additionally, the parser graph 500 may include a first header 204, a second header 208, a third header 212, a fourth header 216, and a fifth header 220, which may represent examples of corresponding headers as described with reference to FIG. 2.

As described with reference to FIGS. 4A and 4B, a packet may include a header 504 (e.g., MPLS header, GTP header, etc.) that do not include fields and/or information indicating what header occurs after the header 504 in the packet, which may result in the parser having to "guess" what the next header is that occurs after the header 504. To overcome such headers that do not include fields and/or information indicating what header occurs after, the parser graph 500 may include a 'null header' 508 (e.g., NULL1 header) construct that enables the parser to transition to the 'null header' 508 and then transition to either the second header 208 (e.g., IPv4 header) or the third header 212 (e.g., IPv6 header).

For example, the parser may begin processing or parsing a packet at the first header 204 (e.g., MAC header) and may transition to the header 504 (e.g., MPLS header in the shown example) based on a value of an NP field for the first header 204 (e.g., NP field of the first header 204 is 0x8847). Subsequently, the parser may transition from the header 504 to the 'null header' 508 in an always manner (e.g., based on the header 504 not having any NP field that resides in its header). The parser may then transition from the 'null header' 508 to the second header 208 or the third header 212 according to an NP field retrieved from the second header 208 or the third header 212 while the parser is still parsing the 'null header' 508, where the NP field is defined as the 'Ver' field in the example of FIG. 5. For example, the 'null header' 508 may be defined to have a zero length, such that the parser does not advance the parser pointer while analyzing or parsing the 'null header' 508.

Accordingly, the parser may look into the next header after the 'null header' 508 without moving the parser pointer to read a field (e.g., 'Ver' or version field or any other field) that is treated as an NP field for the 'null header' 508 and may determine which header and/or protocol occurs after the 'null header' 508 based on the field. For example, if the field is 4, then the parser may transition to the second header 208. Additionally or alternatively, if the field is 6, then the parser may transition to the third header 212. After the parser reaches the second header 208 or the third header 212, the parser may continue a parsing operation as described with reference to FIGS. 2 and 3A-3C (e.g., transition to the fourth header 216 or the fifth header 220 based on NP fields and/or IHL fields in the second header 208 or third header 212).

Table 2 is provided below that lists supported transitions for the parser when performing a corresponding parsing operation according to the parser graph 500 as described in the example of FIG. 5. In some examples, the transition table corresponding to Table 2 may be stored in a memory of a networking device or a memory accessed by the networking device that implements, uses, and/or stores the parser described herein.

TABLE 2

Transition Table for Parsing Example Packet

| Header | NP Field | Next Header |
|--------|----------|-------------|
| MAC | 0x0800 | IPv4 |
| | 0x86DD | IPv6 |
| | 0x8847 | MPLS |
| MPLS | Always | NULL1 |
| NULL1 | 4 | IPv4 |
| | 6 | IPv6 |
| IPv4 | 6 | TCP |
| | 17 | UDP |
| IPv6 | 6 | TCP |
| | 17 | UDP |

FIGS. 6A, 6B, 6C, 6D, and 6E illustrate an example of a parsing operation according to at least one example embodiment of the present disclosure. The parser operation may implement aspects of or may be implemented by aspects of FIGS. 1-5 described herein. For example, the parser operation may represent a method of operation for a parser corresponding to the parser graph 500 as described with reference to FIG. 5, and the parser may represent an example of the parser 116 and 120 as described with reference to FIGS. 1-5. The parser operation may include a first operation 600A, a second operation 600B, a third operation 600C, a fourth operation 600D, and a fifth operation 600E. The different operations may represent an example of how the parser advances a parser pointer 620 when processing or parsing a packet. In some examples, the packet may at least include a first header 604 (e.g., MAC header in the shown example), a second header 608 (e.g., MPLS header in the shown example), a third header 612 (e.g., IPv4 header in the shown example), and a fourth header 616 (e.g., UDP header in the shown example).

In the first operation 600A, the parser pointer 620 may point to a beginning of the first header 604. The parser may then extract a value of an NP field 624 of the first header 604 and look up the value in a corresponding transition table (e.g., Table 2 as provided previously). For example, as illustrated in the example of FIGS. 6A-6E, the lookup value for the NP field 624 may be 0x8847, and the lookup result may indicate for the parser to transition to the second header 608. A header length for the first header 604 may be constant (e.g., specified by IEEE standards), such that the parser knows to advance the parser pointer 620 by a specified number of bytes (e.g., 14 bytes) to the beginning of the second header 608.

In the second operation 600B, the parser pointer 620 may point to a beginning of the second header 608. The parser may determine the second header 608 does not include an NP filed and/or may be unable to extract an NP field from the second header 608. Subsequently, the parser may be instructed or may determine to transition to a 'null header' as described and illustrated with reference to FIG. 5. The size of the second header 608 may be constant (e.g., 4 bytes in length), such that the parser advances the parser pointer 620 to the 'null header,' which may also correspond to a beginning of the third header 612.

Figure 6A:
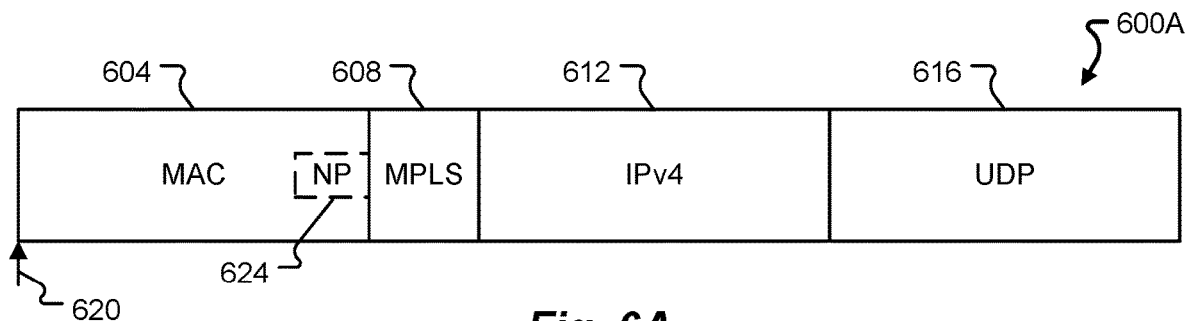
FIGS. 6A, 6B, 6C, 6D, and 6E illustrate an example of a parsing operation according to at least one example embodiment of the present disclosure.
Figure 6B:
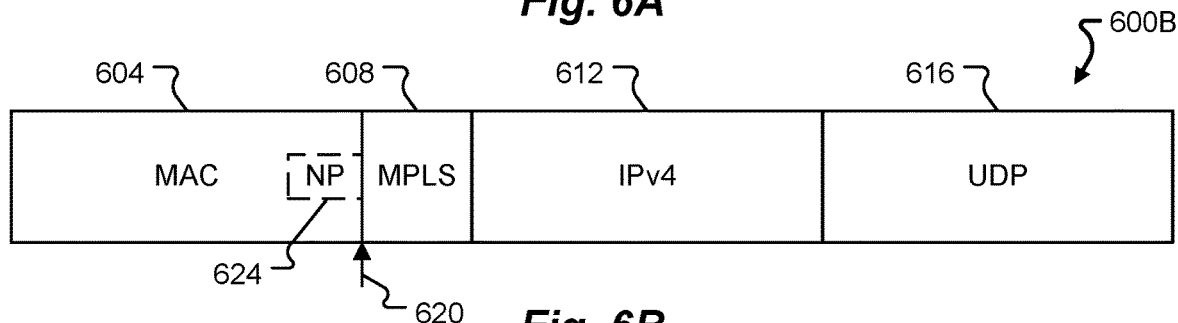
Figure 6C:
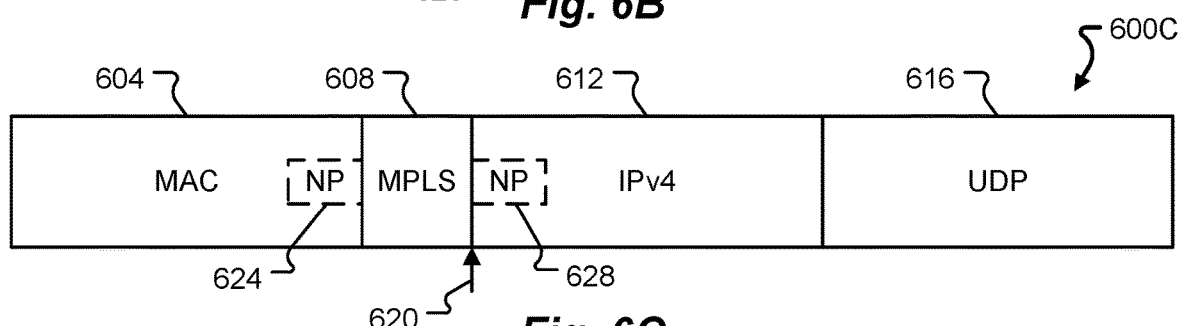
Figure 6D:
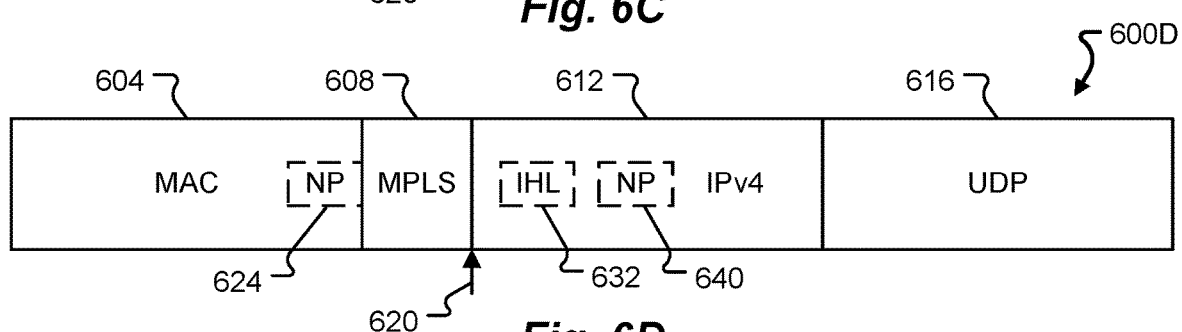
Figure 6E:
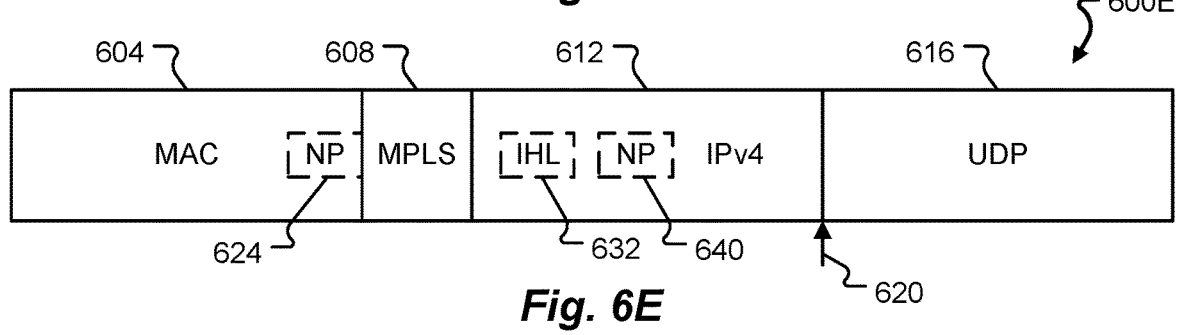

In the third operation 600C, the parser pointer 620 may point to the beginning of the 'null header,' which corresponds to the beginning of the third header 612 but the parser does not know what protocol is comprised by the third header 612 (e.g., whether the third header is an IPv4 header or an IPv6 header). Accordingly, the parser may extract an NP field 628 from the 'null header,' which in the example of FIG. 6C is a field that resides inside the third header 612 (e.g., a 'ver' or version field or another field in the third header 612). The parser may determine the NP field 628 has a value that corresponds to the third header 612 to transition to the third header 612 (e.g., a value of 4 for the NP filed 628 which corresponds to an IPv4 header for the third header 612). In some examples, the 'null header' may be defined as having a zero length, which causes the parser to not advance the parser pointer 620 and keep the parser pointer 620 in a same position between the third operation 600C and the fourth operation 600D.

In the fourth operation 600D, the parser pointer 620 may point to the beginning of the third header 612. The parser may then extract values from an IHL field 632 and an NP field 640 (e.g., the NP field 640 is different from the NP field 628). The parser may determine the NP field 640 comprises a value that corresponds to the fourth header 616 as defined in the corresponding transition table (e.g., Table 2). For example, the NP field 640 may have a value of 17, which corresponds to a UDP header for the fourth header 616 based on the transition table. Additionally, the parser may determine a header length for the third header 612 based on the value of the IHL field 632 (e.g., the header length is computed by the parser as 4xIHL, which equals 20 bytes in the examples of FIG. 6D). Accordingly, the parser may determine to advance the parser pointer 620 based on the calculated header length for the third header 612 to the beginning of the fourth header 616.

In the fifth operation 600E, the parser pointer 620 may point to the beginning of the fourth header 616, and the parser may analyze or parse the fourth header 616. In some examples, the fourth header 616 may be a last header of the packet that the parser parses. After parsing the fourth header 616, the networking device that is implementing the parser may determine how to route the corresponding packet in a communication network and/or may otherwise complete processing the packet for performing a corresponding action associated with the packet.

Figure 7:
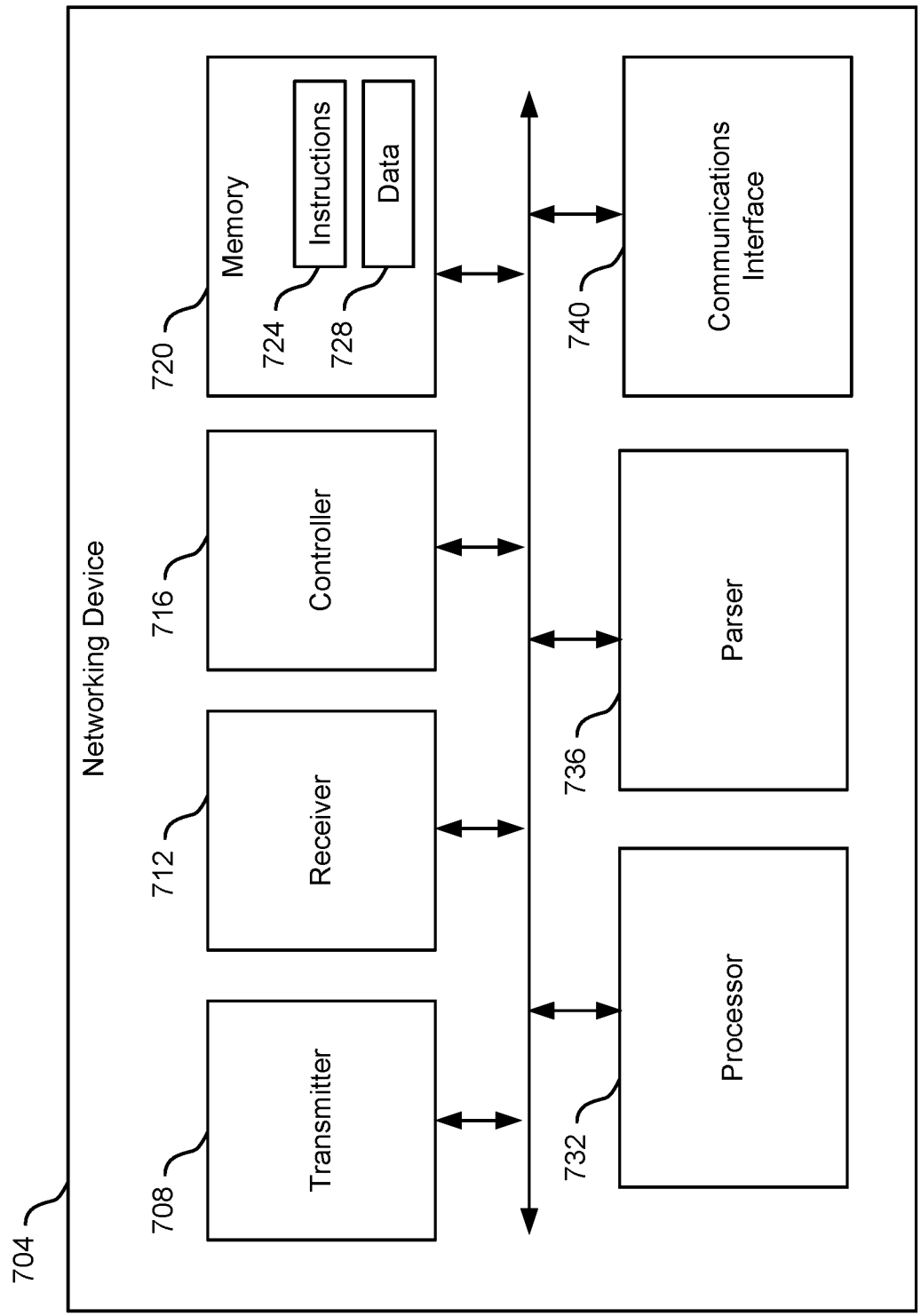
FIG. 7 illustrates an example of system according to at least one example embodiment of the present disclosure.

FIG. 7 illustrates an example of a system 700 configured for parsing and/or analyzing a packet. The system 700 may include a networking device 704. The networking device 704 may include aspects of a client device or a server described herein. In some cases, the networking device 704 may be referred to as a computing resource. The networking device 704 may perform any or all of the operations described in the present disclosure.

The networking device 704 may include a transmitter 708, a receiver 712, a controller 716, a memory 720, a processor 732, a parser 736, and a communications interface 740. In some examples, components of the networking device 704 (e.g., transmitter 708, receiver 712, controller 716, memory 720, processor 732, parser 736, communications interface 740, etc.) may communicate over a system bus (e.g., PCIe bus, control busses, address busses, data busses, etc.) included in the networking device 704.

The transmitter 708 and the receiver 712 may support the transmission and reception of signals to and from the networking device 704. In some aspects, the transmitter 708 and the receiver 712 may support the transmission and reception of signals within the networking device 704. The transmitter 708 and receiver 712 may be collectively referred to as a transceiver. An antenna may be electrically coupled to the transceiver. The networking device 704 may also include (not shown) multiple transmitters 708, multiple receivers 712, multiple transceivers and/or multiple antennas.

The controller 716 may be located on a same chip (e.g., ASIC chip) as the transmitter 708 and/or the receiver 712. In some cases, the controller 716 may be located on a different chip as the transmitter 708 and/or the receiver 712. In some examples, the controller 716 may be located on a chip of or on a chip of another networking device 704. The controller 716 may instruct the transmitter 708 to use one algorithms associated with implementing aspects of the present disclosure described herein. In some examples, the controller 716 may be a programmed microprocessor or microcontroller. In some aspects, the controller 716 may include one or more CPUs, memory, and programmable I/O peripherals.

The memory 720 may be any electronic component capable of storing electronic information. The memory 720 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 720 may include instructions 724 (computer readable code) and data 728 stored thereon. The instructions 724 may be executable by the processor 732 to implement the methods disclosed herein. In some aspects, execution of the instructions 724 may involve one or more portions of the data 728. In some examples, when the processor 732 executes the instructions 724, various portions of the instructions 724 and/or the data 728 may be loaded onto the processor 732.

The processor 732 may correspond to one or multiple computer processing devices. For example, the processor 732 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 720 of the networking device 704). For example, upon executing the instruction sets stored in memory 720, the processor 732 may enable or perform one or more functions of the networking device 704. In some examples, a combination of processors 732 may be implemented in the networking device 704.

The parser 736 may represent an example of a parser as described herein and with reference to FIGS. 1-6E. For example, the parser 736 may be used to read, analyze, parse, etc., a packet received at the networking device 704 to perform different operations based on the packet. In some examples, the different operations may include routing the packet in a communication network or another operation not explicitly listed or described herein. Additionally, the parser 736 may be implemented in the processor 732 and/or an ASIC (e.g., ASIC chip) of the networking device 704.

The communications interface 740 may support interactions (e.g., via a physical or virtual interface) between a user and the networking device 704.

Figure 8:
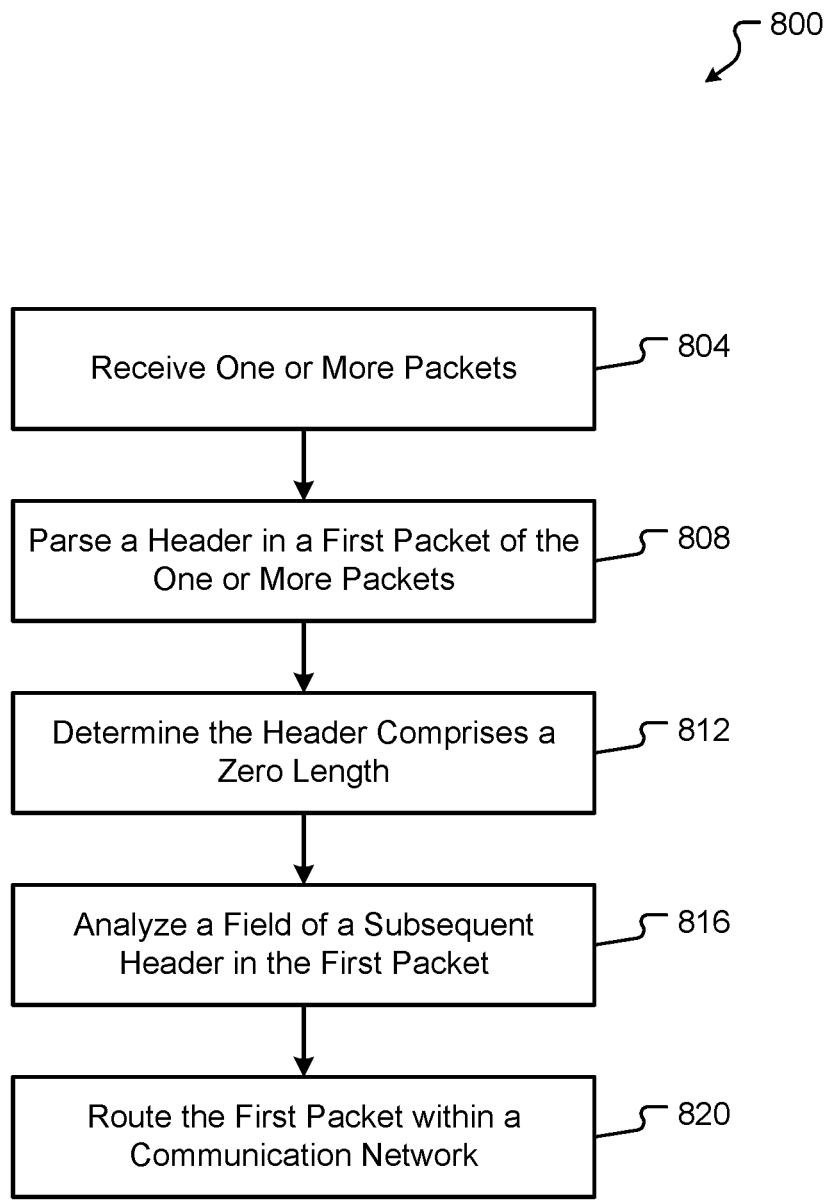
FIG. 8 illustrates a flowchart according to at least one embodiment of the present disclosure.

FIG. 8 depicts a method 800 that may be used, for example, to analyze one or more packets received at a networking device.

The method 800 (and/or one or more steps thereof) may be carried out or otherwise performed, for example, by at least one processor. The at least one processor may be the same as or similar to the processor(s) of the networking device 704 described above. The at least one processor may be part of the networking device 704 or part of a control unit in communication with the networking device 704. A processor other than any processor described herein may also be used to execute the method 800. The at least one processor may perform the method 800 by executing elements stored in a memory (such as a memory in the networking device 704 as described above or a control unit). The elements stored in the memory and executed by the processor may cause the processor to execute one or more steps of a function as shown in method 800. One or more portions of a method 800 may be performed by the processor executing any of the contents of memory, such as analyze one or more packets received at the networking device 704 and/or any associated operations as described herein.

The method 800 comprises receiving one or more packets at a networking device (step 804). For example, the networking device may receive at least a first packet that comprises a plurality of headers. Additionally, the one or more packets may comprise IP packets. In some examples, the networking device may comprise an interface that receives the one or more packets.

The method 800 also comprises parsing a header of the plurality of headers in the first packet (step 808). For example, the networking device may comprise a parser as described herein that is used to parse the header. In some examples, the header may comprise a 'null header' as described with reference to FIGS. 5 and 6A-6E. In some examples, the parser may reference a state machine that includes the 'null header' (e.g., null header state) and may enter the 'null header' automatically in response to parsing a packet header of a predetermined type. For example, the 'null header' may be positioned in the first packet immediately following a given header that does not include an NP field (e.g., the predetermined type), such as an MPLS header, a GTP header, or a different type of header not explicitly listed herein. In some examples, the header or 'null header' may be positioned between a MAC header and an IP version header (e.g., IPv4 or IPv6 header).

The method 800 also comprises determining the header comprises a zero length (step 812). For example, the 'null header' may be defined to have a zero length, such that the networking device and/or parser determines the header to have the zero length.

The method 800 also comprises analyzing, in response to determining that the header comprises a zero length, a field of a subsequent header in the first packet while maintaining a position of a parser pointer at the header, where the subsequent header occurs immediately after the 'null header' (step 816). For example, while in the 'null header' state, the parser may analyze the subsequent header (e.g., subsequent packet header, subsequent set of bytes, etc.) without advancing a parser pointer. In some examples, the subsequent header may comprise an IP version header (e.g., IPv4, IPv6, etc.). Additionally, the field may comprise a version field of the subsequent header and may be treated as an NP field of the header (e.g., of the 'null header'). In some examples, the position of the parser pointer at the header may coincide with a beginning position of the subsequent header.

In some examples, the parser may transition from the header/'null header' state to a subsequent state corresponding to the subsequent header based on the analysis of the subsequent header. For example, the parser may transition from the 'null header' state to a first IP version state or a second IP version state of a corresponding state machine based on analyzing the field (e.g., 'ver' field) of the subsequent header.

In some examples, the networking device and/or parser may then parse the subsequent header and may extract additional information from fields in the subsequent header. For example, the parser may extract data from an IHL field in the subsequent header, where the parser then advances the parser pointer from the header and beginning of the subsequent header based on the data extracted from the IHL field.

The method 800 also comprises routing the first packet within a communication network based at least in part on the analysis of the field in the subsequent header (step 820).

The present disclosure encompasses embodiments of the method 800 that comprise more or fewer steps than those described above, and/or one or more steps that are different than the steps described above.

As noted above, the present disclosure encompasses methods with fewer than all of the steps identified in FIG. 8 (and the corresponding description of the method 800), as well as methods that include additional steps beyond those identified in FIG. 8 (and the corresponding description of the method 800). The present disclosure also encompasses methods that comprise one or more steps from one method described herein, and one or more steps from another method described herein. Any correlation described herein may be or comprise a registration or any other correlation.

While the headers of packets described with reference to FIGS. 2-8 include specific types, such as a MAC header, IPv4 header, IPv6 header, TCP header, UDP header, MPLS header, GTP header, and 'null header,' it is understood the techniques described herein may be used for parsing other types of headers in a packet not explicitly listed herein. Additionally, the 'null header' is understood to be a type of header that comprises a zero length for not advancing a parser point when the corresponding type of header is parsed and for preempting a parser from "guessing" what a next occurring header is as described herein.

Any of the steps, functions, and operations discussed herein can be performed continuously and automatically.

The exemplary systems and methods of this disclosure have been described in relation to a dual connect switch module. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

What is claimed is:

1. A networking device, comprising:
    a parser that analyzes one or more packets by:
        parsing a header in the one or more packets:
        determining the header comprises a zero length; and
        analyzing, in response to determining that the header comprises a zero length, a field of a subsequent header in the one or more packets while maintaining a position of a parser pointer at the header.

2. The networking device of claim 1, wherein the header comprises a NULL header.

3. The networking device of claim 2, wherein the subsequent header comprises an Internet Protocol (IP) version header.

4. The networking device of claim 2, wherein the NULL header is positioned immediately following a Multiprotocol Label Switching (MPLS) header.

5. The networking device of claim 2, wherein the NULL header is positioned immediately following a General Packet Radio Service (GPRS) Tunneling Protocol (GTP) header.

6. The networking device of claim 1, wherein the one or more packets comprise an Internet Protocol (IP) packet.

7. The networking device of claim 1, wherein the header is positioned between a Media Access Control (MAC) header and an Internet Protocol (IP) version header.

8. The networking device of claim 1, wherein the field comprises a version field of the subsequent header and is treated as a Next Protocol (NP) field of the header.

9. The networking device of claim 8, wherein the parser further extracts data from an Internet Header Length (IHL) field of the subsequent header.

10. The networking device of claim 9, wherein the parser advances the parser pointer from the header based on the data extracted from the IHL field.

11. The networking device of claim 1, wherein the position of the parser pointer at the header coincides with a beginning position of the subsequent header.

12. The networking device of claim 1, further comprising an interface that receives the one or more packets.

13. A system, comprising:
    a packet parser; and
    a state machine that includes a NULL header state, wherein the packet parser references the state machine to enter the NULL header state automatically in response to parsing a packet header of a predetermined type and then, while in the NULL header state, analyzes a subsequent set of bytes without advancing a parser pointer.

14. The system of claim 13, wherein the state machine comprises a first Internet Protocol (IP) version state and a second IP version state and wherein the packet parser transitions from the NULL header state to either one of the first IP version state and second IP version state based on the analysis of the subsequent set of bytes.

15. The system of claim 14, wherein the packet parser analyzes an Internet Header Length (IHL) field of the subsequent set of bytes and advances the parser pointer by a number of bytes defined in the IHL field.

16. The system of claim 13, wherein the predetermined type comprises a NULL type and wherein the header comprises a length of zero bytes.

17. The system of claim 13, wherein the packet comprises an Internet Protocol (IP) packet, wherein the subsequent set of bytes comprises an IP version header, and wherein a beginning of the header is positioned coincident with a beginning of the IP version header.

18. The system of claim 17, wherein the header is positioned between the IP version header and a Media Access Control (MAC) header.

19. A networking device, comprising:
a processor; and
memory coupled to the processor, wherein the memory comprises data that, when executed by the processor, enables the processor to:
analyze a header in a packet;
determine the header corresponds to a NULL header; and
analyze, in response to determining that the header corresponds to a NULL header, a field of a subsequent header in the packet while holding a parser pointer at the NULL header.

20. The networking device of claim 19, wherein the processor further routes the packet within a communication network based, at least in part, on the analysis of the field of the subsequent header.

21. The networking device of claim 20, wherein the subsequent header comprises an Internet Protocol (IP) version header and wherein the field of the IP version header comprises at least one of a version field, an (IHL) field, and a Next Protocol (NP) field.

22. The networking device of claim 19, wherein the data in the memory further enables the processor to provide all-to-all connectivity by transitioning from all headers of the packet to NULL header and then transitioning from the NULL header to all the other headers of the packet.

* * * * *